No. 673,857. Patented May 14, 1901.
G. M. ATALL.
COUPLING FOR POLES OR THILLS.
(Application filed Jan. 5, 1901.)

(No Model.)

Witnesses
F. E. Alden
N. F. Riley

G. M. Atall, Inventor.
by C. A. Snow & Co.
Attorneys

UNITED STATES PATENT OFFICE.

GEORGE M. ATALL, OF WAUKON JUNCTION, IOWA.

COUPLING FOR POLES OR THILLS.

SPECIFICATION forming part of Letters Patent No. 673,857, dated May 14, 1901.

Application filed January 5, 1901. Serial No. 42,228. (No model.)

*To all whom it may concern:*

Be it known that I, GEORGE M. ATALL, a citizen of the United States, residing at Waukon Junction, in the county of Allamakee and State of Iowa, have invented a new and useful Coupling for Poles and Thills, of which the following is a specification.

The invention relates to improvements in couplings for poles and thills.

The object of the present invention is to improve the construction of couplings for poles and thills and to provide a simple, inexpensive, and efficient one adapted to be readily applied to the front axle of a vehicle, similar to an ordinary coupling, and capable of enabling a pole or a pair of thills to be readily attached to and detached from a vehicle.

The invention consists in the construction and novel combination and arrangement of parts hereinafter fully described, illustrated in the accompanying drawings, and pointed out in the claims hereto appended.

Figure 1:
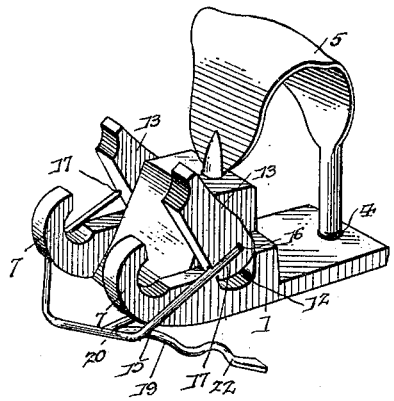
Figure 2:
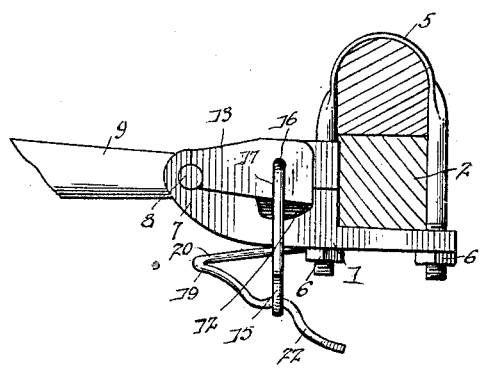
Figure 3:
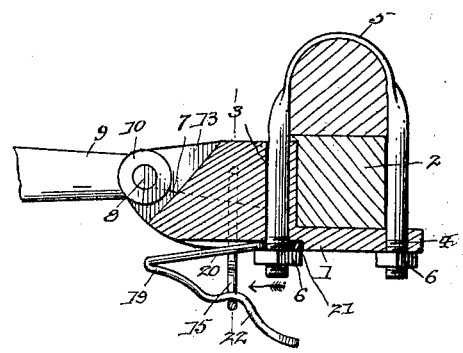
Figure 5:
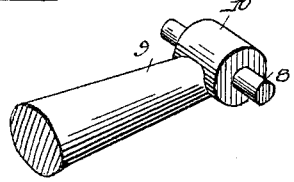
Figure 4:
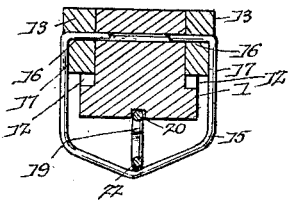

In the drawings, Figure 1 is a perspective view of a coupling constructed in accordance with this invention, the coupling-iron being removed to show the construction of the bearing-plate more clearly. Fig. 2 is a side elevation of the same, the bearings being closed and the coupling-iron being in position. Fig. 3 is a longitudinal sectional view of the same. Fig. 4 is a transverse sectional view. Fig. 5 is a detail view of the coupling-iron.

Like numerals of reference designate corresponding parts in all the figures of the drawings.

1 designates a bearing-plate having its rear portion extending beneath an axle 2 and forming a clip-plate and provided with openings 3 and 4 for the reception of the front and rear sides of an axle-clip 5, having threaded terminals and provided with nuts 6. The front portion of the bearing-plate is enlarged and is provided with a pair of forwardly-extending arms 7, curved upward to form hooks and providing open bearings for a pivot 8 of a coupling-iron 9. The coupling-iron 9 is provided with the usual eye 10, and the pivot may be secured within the same by any suitable means or it may be formed integral with the coupling-iron. The front face 11 of the enlargement of the bearing-plate is inclined, as clearly shown in Figs. 1 and 3 of the accompanying drawings, and the eye or enlargement of the rear end of the coupling-iron is received within the space or recess between the arms 7.

The bearing-plate is provided at opposite sides of the front enlargement with recesses 12, receiving pivoted blocks 13, which form locking devices for retaining the pivot in the open bearings of the arms 7, and the said blocks 13 are adapted to swing upward and downward to release and confine the said pivot. The pivoted blocks are operated by means of an approximately U-shaped loop or member 15, having a tapered lower portion and provided at the upper ends of its sides with inwardly-extending arms or portions 16, passing through perforations of the blocks and extending into a transverse opening of the enlargement of the bearing-plate. The blocks 13 are provided at their outer faces with grooves 17, extending downward from the perforations of the blocks when the latter are in a horizontal position and receiving the sides of the loop 15. The loop 15, which is constructed of resilient material, is adapted to be readily sprung into and out of engagement with the enlargement of the bearing-plate, and it not only pivots the blocks to the bearing-plate, but it secures them to the same. The loop is locked in the position illustrated in Figs. 2 and 3 of the accompanying drawings by an approximately V-shaped spring 19, forming a catch and composed of upper and lower sides, the upper side 20 being arranged within a longitudinal groove of the lower face of the bearing-block and being provided with an eye 21 to receive the front side of the axle-clip. The groove of the bearing-block holds the spring against lateral movement, and the nut of the front side of the axle-clip secures the spring to the bearing-plate. The lower side 22 of the spring is bent or corrugated to provide a shoulder for engaging the loop, as clearly shown in Figs. 2 and 3. When the loop is in engagement with the lower side of the V-shaped spring, the bearing-blocks are firmly held in their closed position. The loop, besides forming the pivots for the blocks and serving as the means for securing them to the bearing-plate, also is adapted to swing the blocks upward and downward to raise them from the position shown in Fig. 2 to that illustrated in Fig. 1 and to return them to the first-mentioned position. The loop is readily manipulated, and when the bearing-blocks are raised, as illustrated in Fig. 1, the coupling-iron may be readily placed in and removed from the bearings of the arms.

It will be seen that the coupling is exceedingly simple and inexpensive in construction, that it is strong and durable, and that it will enable a pole or a pair of thills to be readily attached to and removed from a vehicle.

What I claim is—

1. A device of the class described comprising a bearing-plate provided with open bearings adapted to receive the pivot of a coupling-iron, a pair of pivoted bearing-blocks mounted on the bearing-plate at opposite sides thereof and adapted to swing upward and downward, an exterior loop receiving the bearing-plate and extending beneath the same and connected with the bearing-blocks, said loop being adapted to be oscillated to raise and lower the said blocks, and means for locking the loop, substantially as described.

2. A device of the class described comprising a bearing-plate having open bearings adapted to receive the pivot of a coupling-iron, a pivoted bearing-block mounted on the bearing-plate and arranged to swing upward and downward, a catch arranged at the bottom of the bearing-plate, and a loop connected with and depending from the bearing-block and adapted to be oscillated to raise and lower the same, said loop being engaged by the catch when the bearing-block is closed, substantially as described.

3. A device of the class described comprising a bearing-plate having open bearings to receive the pivot of a coupling-iron, a pair of pivoted bearing-blocks mounted on the bearing-plate and arranged to swing upward and downward, a depending loop extending beneath the bearing-plate and connected with and adapted, when oscillated, to swing the blocks upward and downward, and a catch located beneath the bearing-plate and arranged in the path of the loop and capable of holding the same, substantially as described.

4. A device of the class described comprising a bearing-plate having open bearings, a pair of bearing-blocks arranged to swing upward and downward, the approximately U-shaped loop extending beneath the bearing-plate and having the terminals of its sides bent inward and extending through and projecting beyond the bearing-blocks and forming pivots for connecting the said blocks to the bearing-plate, and a catch arranged in the path of the loop and adapted to hold the same, substantially as described.

5. A device of the class described comprising a bearing-plate having open bearings, movable bearing-blocks provided with perforations and having exterior grooves, and the resilient loop having its sides arranged within the grooves and provided with arms extending through the perforations of the blocks and forming pivots for the same, substantially as described.

6. A device of the class described comprising a bearing-plate provided at its bottom with a groove and having arms provided with open bearings, an axle-clip passing through the bearing-plate, a spring arranged in the groove of the bearing-plate and secured to the same by the axle-clip, movable bearing-blocks arranged at opposite sides of the bearing-plate, and a depending loop connected with the blocks and arranged to be engaged by the spring, substantially as described.

7. In a device of the class described, the combination of a bearing-plate having open bearings for the reception of the pivot of the coupling-iron, a pivoted bearing-block mounted on the bearing-plate and arranged to complete the bearings of the same and provided with a depending member fixed to it, and a catch arranged in the path of the depending member and detachably engaging the same, substantially as described.

In testimony that I claim the foregoing as my own I have hereto affixed my signature in the presence of two witnesses.

GEORGE M. ATALL.

Witnesses:
D. R. WALKER,
D. F. ROBBINS.